(12) United States Patent
Crittenden

(10) Patent No.: US 6,366,312 B1
(45) Date of Patent: Apr. 2, 2002

(54) TESTING COMPONENTS IN DIGITAL IMAGING DEVICES

(75) Inventor: Brent S. Crittenden, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/094,241

(22) Filed: Jun. 9, 1998

(51) Int. Cl.[7] .............................................. H04N 17/00
(52) U.S. Cl. ...................... 348/187; 348/175; 348/180; 348/181; 348/308
(58) Field of Search ................................ 348/187, 175, 348/176, 188, 189, 180, 181, 246, 247, 207, 191, 192, 658, 745, 806, 807, 308, 294, 298; H04N 17/00

(56) References Cited

U.S. PATENT DOCUMENTS

| | | | | |
|---|---|---|---|---|
| 5,033,015 A | * | 7/1991 | Zwirn ........................ 702/116 |
| 5,285,286 A | * | 2/1994 | Kannegundla .............. 348/187 |
| 5,406,329 A | * | 4/1995 | Kashimura et al. ......... 348/175 |
| 5,467,128 A | * | 11/1995 | Yates et al. ................. 348/187 |
| 5,726,915 A | * | 3/1998 | Prager et al. ............... 702/116 |
| 5,742,403 A | * | 4/1998 | Compton et al. ........... 358/406 |
| 5,748,230 A | * | 5/1998 | Orlando et al. ............. 348/187 |
| 6,118,482 A | * | 9/2000 | Clark et al. ................. 348/308 |

FOREIGN PATENT DOCUMENTS

| | | | | |
|---|---|---|---|---|
| JP | 008019007 A | * | 1/1996 | .......... H04N/17/00 |
| JP | 008126035 A | * | 5/1996 | .......... H04N/17/00 |

* cited by examiner

*Primary Examiner*—Reinhard J. Eisenzopf
*Assistant Examiner*—Jean W. Desir
(74) *Attorney, Agent, or Firm*—Trop, Pruner & Hu, P.C.

(57) ABSTRACT

A digital imaging system includes an array of sensors arranged generally in rows and columns and having data lines coupled to the sensors. Receiving logic is coupled to sense voltages on the data lines. A reference voltage generator (which can include a resistor network) generates a plurality of reference voltages in the digital imaging system in response to an applied differential voltage. A test row of sensors are electrically coupled to corresponding reference voltages, each test sensor coupled to a data line and receiving a voltage based on its coupled reference voltage. The receiving logic includes at least one A/D converter that reads the test sensor voltage value and converts it to a digital value.

21 Claims, 5 Drawing Sheets

TESTING COMPONENTS IN DIGITAL IMAGING DEVICES

BACKGROUND

The invention relates to testing components in digital imaging devices.

Digital image processing involves capturing, manipulating and analyzing digital information. A digital imaging device, such as a digital camera, can capture optical images and convert them to digital format. In a typical digital camera, optics are used to focus an optical image onto an array of pixel sensors (arranged in rows and columns) that electrically capture the image. The sensors are electrically coupled to one or more analog-to-digital (A/D) converters that convert the analog sensor signals to digital signals that are supplied to other components for further processing, including transmission to a computer. Referring to FIG. 1, for example, in an imaging system 10, a digital camera 12 can capture an optical image 11 and transmit a stream of data representing the image 11 to a computer 14, where the image data can be further processed.

After manufacture of a digital imaging device, components (including analog components such as the pixel sensors, associated circuitry, amplifiers, and A/D converters) in the device are tested to ensure functionality. Faults that can occur in the pixel sensor array and associated circuitry include stuck-at faults (such as a sensor bit or a wire being stuck at a fixed voltage) and shorts (such as two columns of sensors being shorted). Other components that can be tested include amplifiers (which are set to have predetermined gain values) and A/D converters (which for optimal performance must have a predetermined linearity across a range of input and output signal values).

One system for performing tests includes using high precision voltage supplies in the tester system to apply predetermined voltages to the sensor array of a digital imaging system and checking the output values from the A/D converters. Given an applied input voltage, a predetermined output voltage is expected from the A/D converter. A test system capable of generating high precision voltage values (e.g., voltages precise to the millivolt range) is typically needed to perform accurate testing of the analog components of the digital imaging system.

To check if the A/D converters in the device have the desired linearity, a range of input voltages can be applied to the sensor array, with the output voltages from the A/D converters checked. Again, to ensure accurate testing, the applied voltages typically are based off high precision supply voltages generated in the tester system.

By using high precision supply voltages in tester systems, test cost and time are increased. Testers with high precision voltage supplies are typically costly. Further, during the testing sequence, a waiting period is required after a change in the applied voltage to allow the signal time to settle. With the relatively large number of test cycles involved in testing a sensor array in a digital imaging device, the test time can be dramatically increased which raises testing cost.

SUMMARY

The invention generally relates to testing components in a digital imaging system using test circuitry having a reference voltage generator.

In general, in one aspect, the invention features a digital imaging device including an array of sensors having data lines coupled to the sensors. Receiving logic is coupled to sense voltages on the data lines. A test circuit includes a reference voltage generator that generates a plurality of reference voltages in response to an applied differential voltage. A plurality of test sensors are electrically coupled to corresponding reference voltages, each test sensor electrically coupled to a data line and receiving a voltage based on its coupled reference voltage.

Other features will become apparent from the following description and from the claims.

DETAILED DESCRIPTION

Figure 2:
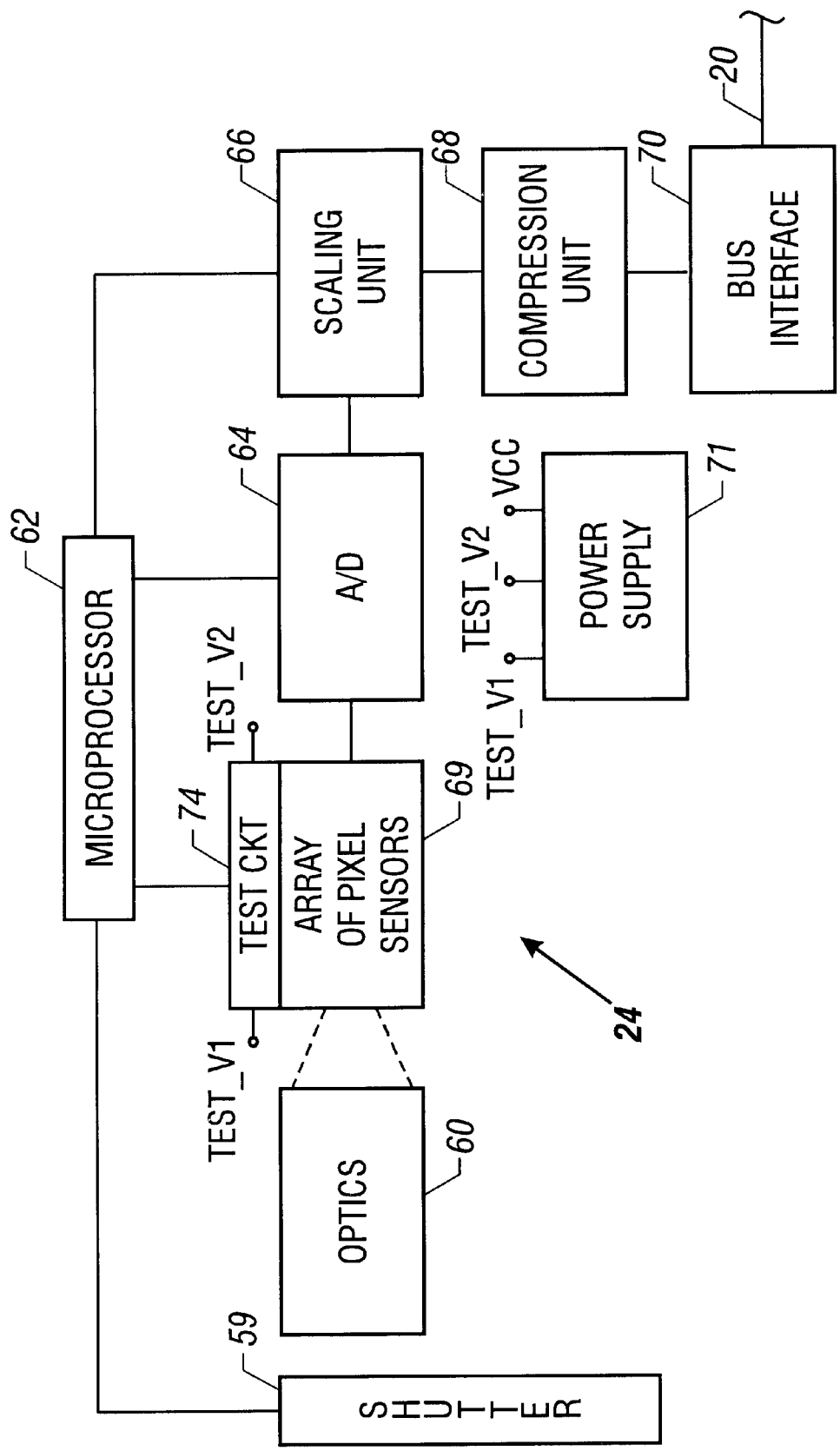
FIG. 2 is a block diagram of a digital imaging system having test circuitry according to an embodiment of the present invention.

Referring to FIG. 2, a digital imaging system 24 (such as a digital camera) includes test circuitry 74 according to an embodiment of the invention. The test circuitry 74 includes a reference voltage generator that is connected to a pair of test voltages TEST_V1 and TEST_V2 which establish a differential voltage. The test voltages TEST_V1 and TEST_V2 according to one embodiment can be generated locally in the digital imaging system 24 using a power supply circuit 71, which further produces other supply voltages such as VCC. From the differential voltage, the reference voltage generator in the test circuitry 74 can generate multiple voltage signals supplied to an array of pixel sensors 69 (a CMOS pixel sensor array, for example) for testing operations. During a test sequence, voltage signals are applied to the sensor array 69 and the output signals from the array 69 are read out through the same path as in normal operation.

The camera 24 includes optics components 60 that focus the optical image to be captured onto the sensor array. An analog-to-digital (A/D) converter 64 receives output analog signals from the sensors 69 and furnishes the signals to a scaling unit 66, which scales a frame of video data according to the resolution desired. One snapshot taken by the camera 24 captures a frame of video data.

In some embodiments, the operation of the digital camera 24 is controlled by a microprocessor or microcontroller 62 that cooperates with the scaling unit 66 to scale a captured frame and a compression unit 68 to compress the size of the frame that is transmitted across a bus 20 through a bus interface 70. The microcontroller 62 also controls the amount of exposure time to the image of the sensors 69 by operating a camera shutter 59. In addition, according to an embodiment of the invention, the microcontroller 62 further controls sequencing and activation of test signals provided to the test circuitry 74 for testing components in the digital camera 24.

Figure 3:
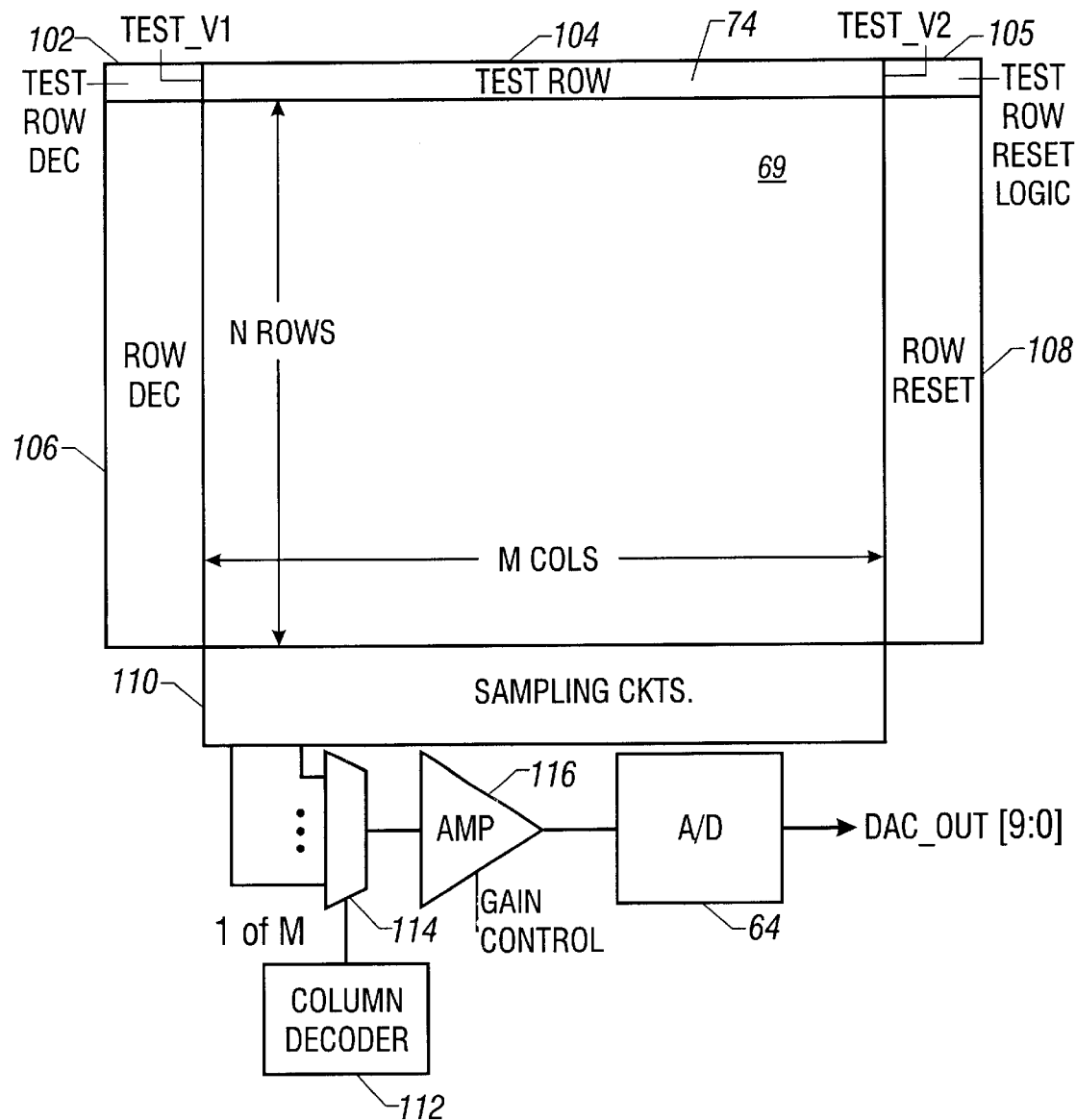
FIG. 3 is a more detailed block diagram of components of the digital imaging system of FIG. 2, including a pixel sensor array, an A/D converter, and the test circuitry.

Referring to FIG. 3, a more detailed block diagram is shown of the sensor array 69 and its associated circuitry. Generally, the sensor array 69 is arranged as N rows and M columns of sensors (which can include photodiodes). Row decoders 106 are operatively coupled to activate one of the N rows during a read operation. In the illustrated embodiment, M data lines (or column lines) run generally along the column direction. Voltages on the column or data lines are sensed and received by receiving logic, including sampling circuitry 110, a multiplexer 114, an amplifier 116, and one or more A/D converters 64. Upon selection of a row of sensors by the row decoder 106, the charges stored in the sensors in the selected row are transferred to charge storage devices (e.g., capacitors) in the sampling circuitry 110. The outputs of the charge storage devices in the sampling circuitry 110 are in turn coupled to the inputs of a multiplexer 114, which is capable of selecting one or more of the M inputs that correspond to the M columns of sensors. The select inputs to the multiplexer 114 are generated by a column decoder 112 to perform 1 of M (or k of M, k greater than one) decoding.

The output of the multiplexer 114 is amplified by an amplifier 116 and provided to an A/D converter 64. The gain of the amplifier 116 is adjustable. The A/D converter 64 produces digital output signals (e.g., DAC_OUT[9:0]), which can be subjected to further digital processing. In one embodiment, characteristics of the A/D converter 64 (such as its linearity) are programmable by the microcontroller 62 (FIG. 2) under control of firmware or software. Similarly, the gain of the amplifier 116 is controllable by the controller 62. Although the illustrated embodiment shows only one A/D converter 64 associated with the sensor array 69, the use of multiple A/D converters for increasing output and data transfer bandwidth can be readily accomplished.

When the sensor array 69 is inactive, row reset logic 108 is activated to reset each of the photodiodes to a known voltage value (e.g., Vcc–Vtn, where Vtn is the threshold voltage of an N-channel metal-oxide semiconductor field effect transistor or MOSFET).

To test the sensor array, the test circuitry 74 according to one embodiment of the invention is arranged at the top of the sensor array 69 and includes a test row 104, test decoder 102, and test reset logic 105. As with the regular rows in the sensor array 69, the test row 104 includes photodiodes that are selected upon activation of the test row line (TEST_ROW) by the test decoder 102. During a test sequence performed under control of firmware running on the microcontroller, for example, the test decoder 102 also activates a sampling signal TEST_SAMPLE that enables the test row selection. The photodiodes of the test row 104 are coupled onto the M column lines, whose voltages are sampled by the sampling circuit 110. The voltages on the column lines are sequentially read by the multiplexer 114, amplifier 116, and A/D converter 64. The test reset logic 105 activates a TEST_RESET signal to couple the test sensors to corresponding reference voltages. Effectively, when TEST_RESET is high, each test sensor captures a known voltage value for later test read-out.

During the test sequence, voltage values from the test row 104 are read out through the A/D converter 64 and analyzed to determine the operational characteristics of the digital imaging system 24. Such operational characteristics may include faults (e.g., shorts, stuck-at faults) and analog component behavior (including behavior of the amplifier 116 and the A/D converter 64).

Figure 4:
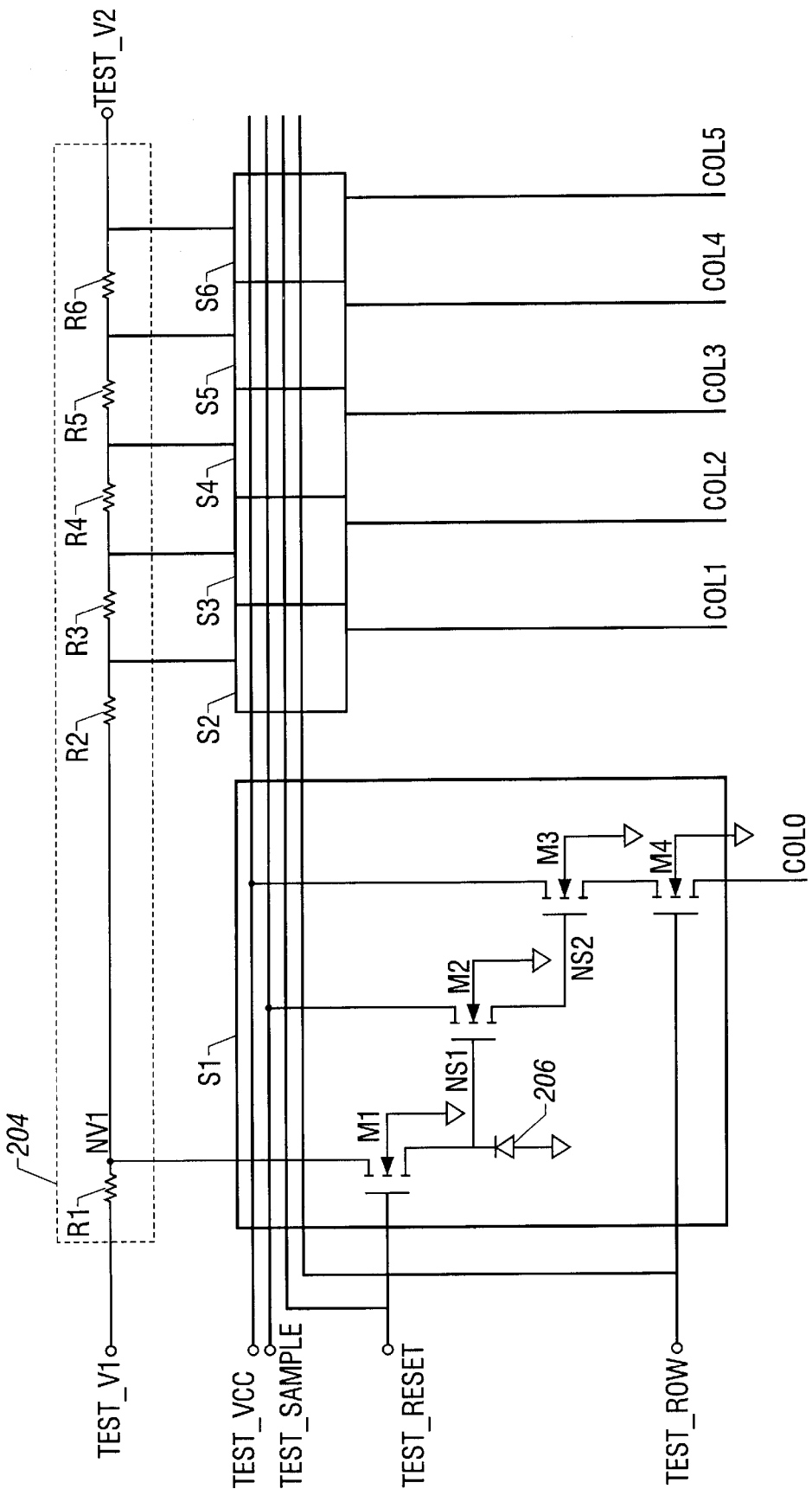
FIG. 4 is a schematic diagram of one embodiment of the test circuitry of FIG. 2.

Referring to FIG. 4, the test row 104 has a reference voltage generator 204 that in one embodiment includes a resistor network having a series of resistors R1, R2, ..., RM. The voltage TEST_V1 is applied at one end of the resistor network while the voltage TEST_V2 is applied at the other end of the resistor network. TEST_V1 and TEST_V2 establish a differential voltage across the resistor network. Example voltages that can be selected for TEST_V1 and TEST_V2 are Vcc for one and Vcc/2 for the other.

A voltage drop is created by the resistors R1, R2, ..., RM between TEST_V1 and TEST_V2. Sensors in the test row 104 are coupled to different nodes (NV1, NV2, ..., NVM) along the resistor network 204. If the resistors R1, R2, ..., RM are selected to have identical or almost identical resistance values (to within a minimum tolerance), uniform voltage drops can be created along the resistor network 204. Because of the large number of sensors (e.g., hundreds of sensors) in the test row 104, the voltage difference between any two adjacent nodes NVi and NVi+1 can be very small (e.g., in the millivolt range). Because the resistor network 204 is coupled to the differential voltage applied by TEST_V1 and TEST_V2, those voltages need not be precision voltages. In fact, the resistor network 204 inherently provides the necessary resolution of voltage steps going along NV1, NV2, ..., NVM. Thus, in effect, the reference voltage generator 204 arranged in the digital imaging device 24 provides the necessary precision voltages without the need for expensive precision voltage supplies located in a tester system.

The test row 104 includes M test sensors S1, S2, ..., SM, each including a photodiode 206 and switching transistors. The photodiode 206 is coupled between a ground voltage and node NS1, which is the source of an N-channel MOSFET M1. The transistor M1 is controllable by the TEST_RESET signal and its drain is connected to a voltage node in the resistor network 204. TEST_RESET can be driven to one threshold voltage (Vtn) or greater above the higher voltage of TEST_V1 and TEST_V2 to ensure that a voltage on the resistor network 204 can be fully transferred to a corresponding photodiode. Thus, when TEST_RESET is high, the photodiode 206 in the sensor S1 is precharged to a known voltage, in this case NV1. In the illustrated embodiment, the voltage NV1 differs from TEST_V1 by approximately one R1 voltage drop.

Figure 1:
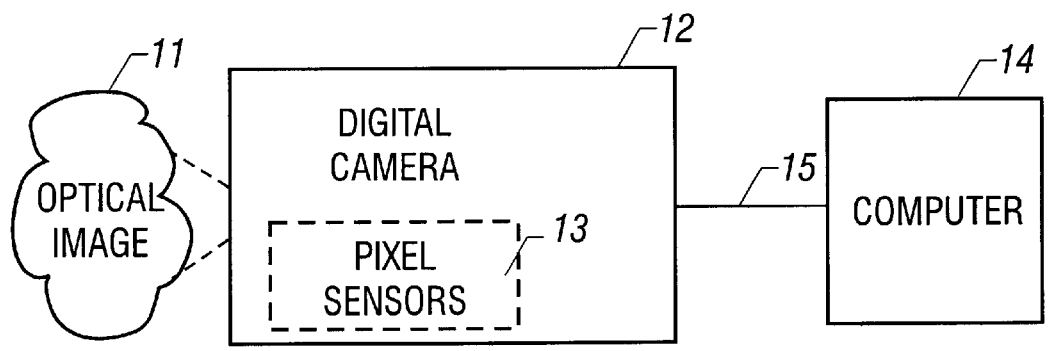
FIG. 1 is a block diagram of a prior art imaging system.
Figure 5:
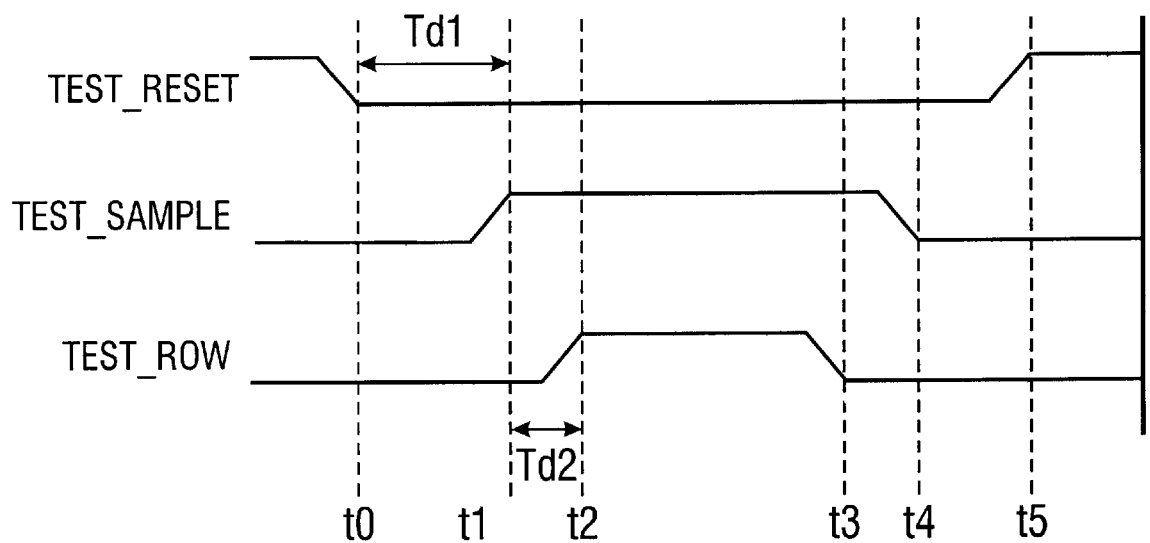
FIG. 5 is a timing diagram of test signals associated with the test circuitry of FIG. 4.

Referring further to FIG. 5, the timings of the different signals used to control the test sensors S1, S2, ..., SM are illustrated. The timings of these signals are controlled by the microcontroller 62. To begin a test cycle, the signal TEST_RESET is deactivated low at t0. As noted above, while the signal TEST_RESET is high, the photodiodes in the test row capture known voltage values—the reference voltages provided by the reference voltage generator 204. A predetermined time period (Td1) later, a signal TEST_SAMPLE is activated high at t1. TEST_SAMPLE is connected to the drain of an N-channel MOSFET M2 that has its gate connected to the node NS1 and its source connected to the gate of an N-channel MOSFET M3. The drain of the transistor M3 is connected to TEST_VCC (which can be derived from the same Vcc power supply voltages as the rest of the digital imaging device) and the transistor's source is connected to the drain of an N-channel MOSFET M4. The gate of the transistor M4 is connected to the test signal TEST_ROW and its source is connected to column line COL1. In one embodiment, the structure of each of the other sensors S2, S3, ... SM is identical to the sensor S1 depicted, except that NV1 is replaced with NVi (i=2 ... M) and COL1 is replaced with COLi.

When TEST_SAMPLE is activated, the transistor M2 allows charge to flow through to charge the gate of the transistor M3 (or node NS2) to the voltage of NS1 less the threshold voltage Vtn of the transistor M2. Once TEST_

SAMPLE is activated, the transistor M3 is activated to allow charge on TEST_VCC to flow through. A predetermined time period Td2 later, the signal TEST_ROW is activated at t2 to activate the transistor M4 to couple TEST_VCC to the column line COLi. The voltage that is coupled onto COLi is dependent on the voltage of each resistor network node NVi. The higher the voltage of NVi, the larger the voltage applied to NS1 and NS2, which in turn causes COLi to have a larger voltage.

The voltages on COLi (i=1, . . . , M) are sensed by the sampling circuit 110 and the A/D converer 64. By using voltage values NV1, NV2 . . . , NVM instead of using precision test supply voltages in a tester system, a relatively inexpensive circuit has been developed to provide the voltage drop of desired resolution. In fact, by using the test circuitry 110 according to one embodiment of the invention, use of high precision voltages can be avoided.

Once a test cycle is completed, the signal TEST_ROW is deactivated low at t3, the signal TEST_SAMPLE is deactivated at t4, and the signal TEST_RESET is activated high at t5. The test cycle can be repeated.

To test the linearity of the A/D converter 64 and the gain of the amplifier 116, each column is selected sequentially and sensed by the A/D converter 64. Based on the known voltages captured by the test sensors (during TEST_RESET), the A/D converter 64 is expected to output predetermined values. Linearity of the A/D converter 64 can thus be determined by analyzing its performance across a range of input voltages. Adjustments can be made by programming internal configuration registers in the A/D converter 64.

Further, testing can also determine if the amplifier 116 has the desired gain. If not, its gain can be adjusted. Other faults can also be determined, including stuck-at faults in the sensor array, which can be caused by a column line being shorted to a fixed voltage, discontinuities in the data path, two column lines being shorted together, and faulty wiring in the receiving logic (including the sampling circuit 110, multiplexer 114, amplifier 116, and A/D converter 64). Typically, a sequence of tests are performed to determine the type of fault that has occurred. Such test sequences are generally known in the art.

Figure 6:
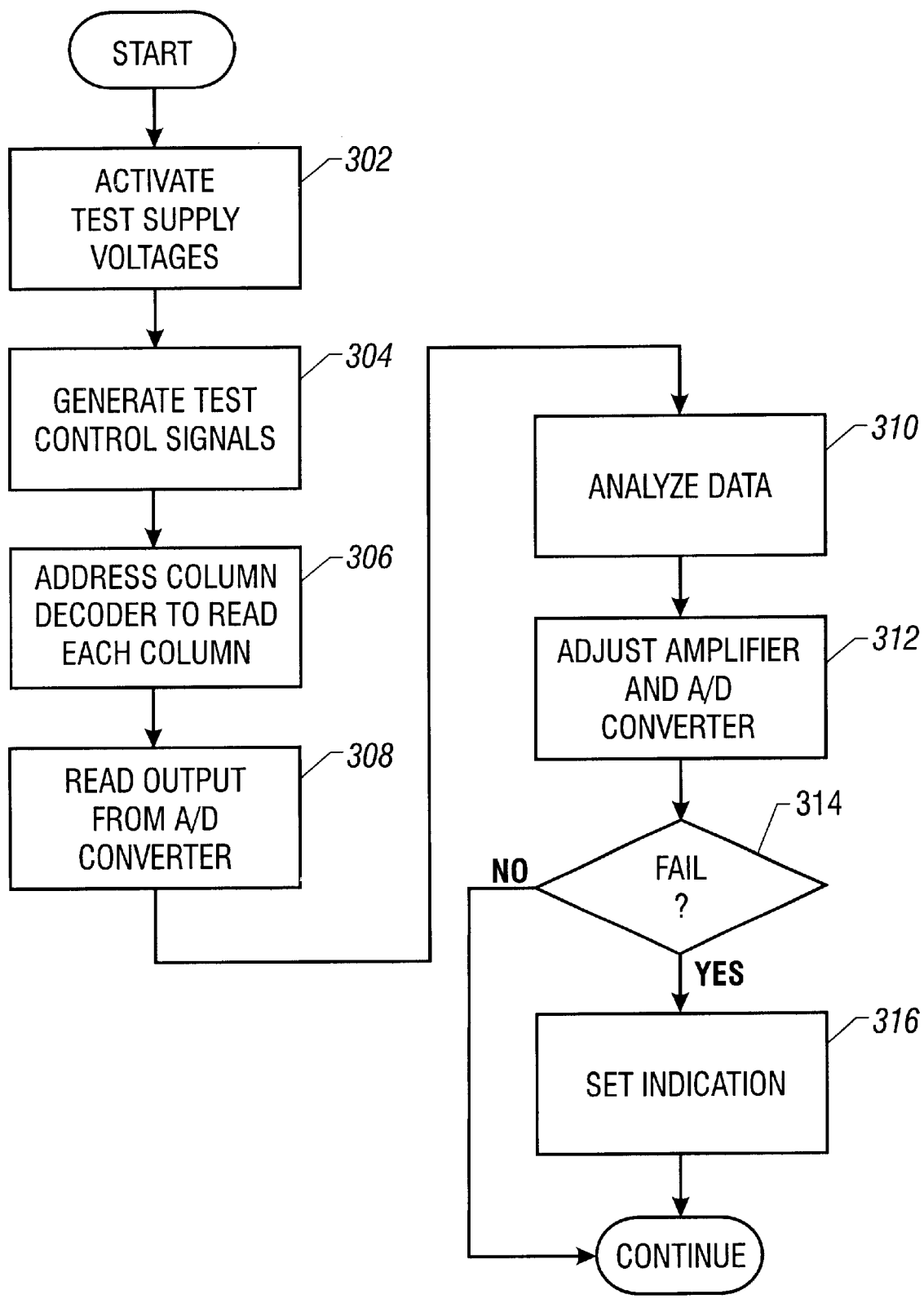
FIG. 6 is a flow diagram of firmware running on a microcontroller in the digital imaging system of FIG. 2.

Referring to FIG. 6, the flow of the firmware running on the microcontroller 62 that controls the test sequence is shown. During non-test operations, TEST_V1 and TEST_V2 can be deasserted for power savings. When a test sequence is desired, the voltages are activated to desired values (step 302). Next, the test signals TEST_RESET, TEST_SAMPLE, and TEST_ROW are generated to activate the test row 104 so that voltages stored in the sensors S1–SM in the test row 104 are coupled onto the column lines COL1-M (step 304).

The column decoder 112 is then addressed to sequentially read out the values held in the sampling circuitry 110 (step 306). The column values are amplified by the amplifier 116 and converted by the A/D converter (step 308).

Next, the data values read are analyzed to determine if there are faults and to determine if the amplifier 116 and A/D converter 64 need to be adjusted (step 310). If needed, the gain of the amplifier 116 is adjusted and/or the A/D converter 64 is programmed to adjust its linearity (step 312).

If a failure is detected (step 314), an indication is made, e.g., flashing an LED light or displaying an error message on a display of the digital imaging system 24 (step 316).

The test sequence can be repeated. Further, the values of TEST_V1 and TEST_V2 and other test conditions can be varied if desired.

The testing described can be performed completely within the digital imaging system 24 (such as a digital camera). The test sequence can be activated at predetermined times, such as during power up. This allows components in the digital imaging system 24 to be tested periodically for faults. Further, compensation for variations in ambient conditions (e.g., temperature) can be made by adjusting the analog components such as the amplifier 116 and the A/D converter 64.

Other embodiments are also within the scope of the following claims. For example, although one configuration of an array of pixel sensors has been illustrated, other configurations are possible. Further, the test row can be arranged in different parts of the sensor arrays, such as at the bottom of the array. Multiple test rows in the sensor array can also be used.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A digital imaging device, comprising:
   an array of sensors having data lines coupled to the sensors;
   receiving logic coupled to sense voltages on the data lines; and
   a test circuit, including:
   a reference voltage generator responsive to an applied differential voltage to provide greater than two voltage nodes at corresponding different voltages; and
   a plurality of test sensors electrically coupled to different ones of the greater than two voltage nodes, each test sensor coupled to a data line and to receive a voltage based on its coupled voltage node.

2. The digital imaging device of claim 1, wherein the array is arranged generally in rows and columns of sensors, and wherein the test circuit includes a test row of sensors.

3. The digital imaging device of claim 2, wherein the test row of sensors are coupled to column lines in the array, the test row of sensors including photodiodes each electrically coupled to capture a voltage based on a corresponding reference voltage during a test sequence.

4. A digital imaging device, comprising:
   an array of sensors having data lines coupled to the sensors;
   receiving logic coupled to sense voltages on the data lines; and
   a test circuit, including:
   a reference voltage generator that generates a plurality of reference voltages in response to an applied differential voltage; and
   a plurality of test sensors electrically coupled to corresponding reference voltages, each test sensor coupled to a data line and to receive a voltage based on its coupled reference voltage,
   wherein the reference voltage generator includes a resistor network having resistors arranged in series,
   wherein the resistors have the same resistance values to provide reference voltages having the same voltage steps along the resistor network.

5. A digital imaging device, comprising:
   an array of sensors having data lines coupled to the sensors;

receiving logic coupled to sense voltages on the data lines; and a test circuit, including:

a reference voltage generator that generates a plurality of reference voltages in response to an applied differential voltage; and a plurality of test sensors electrically coupled to corresponding reference voltages, each test sensor coupled to a data line and to receive a voltage based on its coupled reference voltage, wherein the reference voltage generator includes a resistor network having resistors arranged in series, wherein the same number of reference voltages are provided by the resistor network as test sensors.

6. A digital imaging device, comprising:

an array of sensors having data lines coupled to the sensors;

receiving logic coupled to sense voltages on the data lines; and a test circuit, including:

a reference voltage generator that generates a plurality of reference voltages in response to an applied differential voltage; and a plurality of test sensors electrically coupled to corresponding reference voltages, each test sensor coupled to a data line and to receive a voltage based on its coupled reference voltage, wherein the receiving logic includes at least one analog-to-digital converter.

7. The digital imaging device of claim 6, wherein linearity characteristics of the analog-to-digital converter is tested by reading the test sensors.

8. A method of testing components in a digital imaging device having an array of sensors, the method comprising:

generating reference voltages using a reference voltage generator in the digital imaging device;

electrically coupling test sensors to corresponding reference voltages and data lines in the sensor array;

receiving, in each test sensor, voltages based on the corresponding reference voltage; and reading the voltages of each test sensor, wherein the digital imaging device includes at least one analog-to-digital converter to read the test sensors, the method further comprising sequentially reading the test sensors to analyze linearity characteristics of the analog-to-digital converter.

9. The method of claim 8, wherein the reference voltage generator includes a resistor network having resistors connected in series to provide the reference voltages.

10. The method of claim 8, wherein the sensor array is arranged generally in rows and columns, and wherein the test sensors are arranged in a test row, the method further comprising applying a test row activation signal.

11. The method of claim 10, wherein activation of the test row activation signal causes voltages stored in the test sensors to be coupled onto the data lines.

12. The method of claim 8, wherein the reference voltages have the same voltage steps.

13. The method of claim 12, wherein the reference voltages are provided by a reference voltage generator having a resistor network with resistors connected in series, the same voltage steps being provided by selecting resistors having the same resistance values.

14. A digital camera, comprising:

an array of sensors arranged generally in rows and columns and having data lines coupled to the sensors;

receiving logic coupled to sense voltages on the data lines;

a reference voltage generator to generate a plurality of reference voltages in response to an applied differential voltage; and a test row of sensors electrically coupled to corresponding reference voltages, each test sensor to receive a voltage based on its coupled reference voltage, the test row when activated to electrically couple voltage values onto the data lines, wherein the reference voltage generator includes a resistor network having resistors arranged in a series, wherein the resistors have the same resistance values to provide reference voltages having the same voltage steps along the resistor network.

15. A digital camera, comprising:

an array of sensors arranged generally in rows and columns and having data lines coupled to the sensors;

receiving logic coupled to sense voltages on the data lines;

a reference voltage generator to generate a plurality of reference voltages in response to an applied differential voltage; and a test row of sensors electrically coupled to corresponding reference voltages, each test sensor to receive a voltage based on its coupled reference voltage, the test row when activated to electrically couple voltage values onto the data lines, wherein the receiving logic includes at least one analog-to-digital converter.

16. The digital camera of claim 15, wherein the test row of sensors includes photodiodes each electrically coupled to receive a voltage based on a corresponding reference voltage during a test sequence.

17. The digital camera of claim 15, wherein linearity characteristics of the analog-to-digital converter is tested by sequentially reading the test sensors.

18. A method of testing components in a digital imaging device having a sensor array, the method comprising:

providing a plurality of reference voltages using a resistor network in the digital imaging device to corresponding test sensors, the resistor network having resistors arranged in series, and the resistors having substantially the same values to provide reference voltages having substantially the same voltage steps along the resistor network;

each test sensor sensing a voltage based on the provided reference voltage;

reading the test sensor values; and determining operational characteristics of the digital imaging device based on the test sensor values.

19. The method of claim 18, wherein the reference voltages are provided by a resistor network.

20. The method of claim 18, further comprising arranging the test sensors in a test row.

21. The method of claim 18, performing the providing, sensing, reading, and determining steps all in the digital imaging device.

* * * * *